(12) United States Patent
Yamaguchi

(10) Patent No.: US 11,751,258 B2
(45) Date of Patent: Sep. 5, 2023

(54) CONTROL METHOD FOR DISPLAYING A CODE IMAGE WHEN TRANSMISSION OF INFORMATION FOR ESTABLISHING A CONNECTION FAILS, STORAGE MEDIUM, AND INFORMATION PROCESSING APPARATUS

(71) Applicant: Canon Kabushiki Kaisha, Tokyo (JP)

(72) Inventor: Yoshinori Yamaguchi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 108 days.

(21) Appl. No.: 17/217,206

(22) Filed: Mar. 30, 2021

(65) Prior Publication Data
US 2021/0307088 A1    Sep. 30, 2021

(30) Foreign Application Priority Data

Mar. 31, 2020 (JP) ................. 2020-064200

(51) Int. Cl.
*H04W 76/10* (2018.01)
*G06F 3/12* (2006.01)
*H04W 8/00* (2009.01)

(52) U.S. Cl.
CPC .......... *H04W 76/10* (2018.02); *G06F 3/1203* (2013.01); *G06F 3/1236* (2013.01); *H04W 8/005* (2013.01)

(58) Field of Classification Search
CPC ..... H04W 76/10; H04W 8/005; G06F 3/1203; G06F 3/1236; G06F 3/1292; G06F 3/1261; G06Q 20/3274

USPC ................ 370/329; 358/1.15, 1.14, 1.13, 1.1
See application file for complete search history.

(56) References Cited

U.S. PATENT DOCUMENTS

| | | | | |
|---|---|---|---|---|
| 8,891,106 | B1* | 11/2014 | Haapanen | G06F 3/1236 358/1.14 |
| 10,708,959 | B2* | 7/2020 | Kawaura | G06F 3/1238 |
| 2014/0273820 | A1* | 9/2014 | Narayan | H04W 12/06 455/41.1 |
| 2015/0002870 | A1* | 1/2015 | Burke, Jr. | G06F 3/1292 358/1.13 |
| 2017/0264758 | A1* | 9/2017 | Naito | H04N 1/00315 |
| 2021/0096798 | A1 | 4/2021 | Nakamura et al. | |

FOREIGN PATENT DOCUMENTS

JP    2018191252 A    11/2018

* cited by examiner

*Primary Examiner* — Juan M Guillermety
(74) *Attorney, Agent, or Firm* — Venable LLP

(57) ABSTRACT

There is provided a control method executed by a first information processing apparatus to establish a connection between a first communication apparatus and a second communication apparatus, the method comprising: acquiring information for establishing a connection to a first communication apparatus; and displaying on a display unit a screen including a code image generated based on the acquired information and a message prompting a user to capture the code image by a second information processing apparatus that is more portable than the first information processing apparatus.

16 Claims, 9 Drawing Sheets

SETUP PROGRAM

WIRELESS LAN SETUP METHOD
PLEASE SELECT SETUP METHOD FROM FOLLOWING.
ONCE SELECTED, PLEASE CLICK "NEXT".

○ SET MANUALLY
○ SET BY ROUTER BUTTON (WPS)
● TWO-DIMENSIONAL CODE

502

NEXT

DoWLANSetup;aabbccdd;password

CONTROL METHOD FOR DISPLAYING A CODE IMAGE WHEN TRANSMISSION OF INFORMATION FOR ESTABLISHING A CONNECTION FAILS, STORAGE MEDIUM, AND INFORMATION PROCESSING APPARATUS

BACKGROUND OF THE INVENTION

Field of the Invention

The present invention relates to an information processing apparatus, a storage medium, and a control method for an image forming apparatus to join a wireless LAN.

Description of the Related Art

In recent years, cases where a person owns a plurality of information processing apparatuses, such as smart phones, PCs, and tablets, provided with a wireless communication function and uses each separately in accordance with its intended use are increasing. Also, many communication devices, such as printers and digital cameras, are provided with a wireless communication function, and these devices are often used via a wireless network from an information processing apparatus by connecting them to the same wireless network.

PTL1 proposes a technique in which a PC searches for a printer that is in a wireless setting mode, performs a Peer to Peer connection (hereinafter, called P2P connection) with the detected printer, transmits to the printer a wireless profile stored within the PC, and performs a wireless setting of the printer (refer to Japanese Patent Laid-Open No. 2018-191252).

However, a wireless setting of a printer by a P2P connection may fail in cases where the distance between a PC and a printer is long or a communication environment is poor. In such cases, a user needs to operate an information processing apparatus or printer to input information to be used for establishing a connection to an access point, and settings for connecting a communication device to a wireless network may be difficult for the user.

SUMMARY OF THE INVENTION

An aspect of the present invention is to eliminate the above-mentioned problem with conventional technology.

A feature of the present invention is to provide a technique for improving convenience in connecting to a network a communication device.

According to a first aspect of the present invention, there is provided a control method executed by a first information processing apparatus to establish a connection between a first communication apparatus and a second communication apparatus, the method comprising: acquiring information for establishing a connection to a first communication apparatus; and displaying on a display un screen including a code image generated based on the acquired information and a message prompting a user to capture the code image by a second information processing apparatus that is more portable than the first information processing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view illustrating an example of a screen for selecting a wireless LAN setup method displayed by the setup program of the information processing apparatus.

FIG. 6 is a view illustrating an example of a command for prompting the printing apparatus to perform a wireless LAN setup.

DESCRIPTION OF THE EMBODIMENTS

Figure 1:
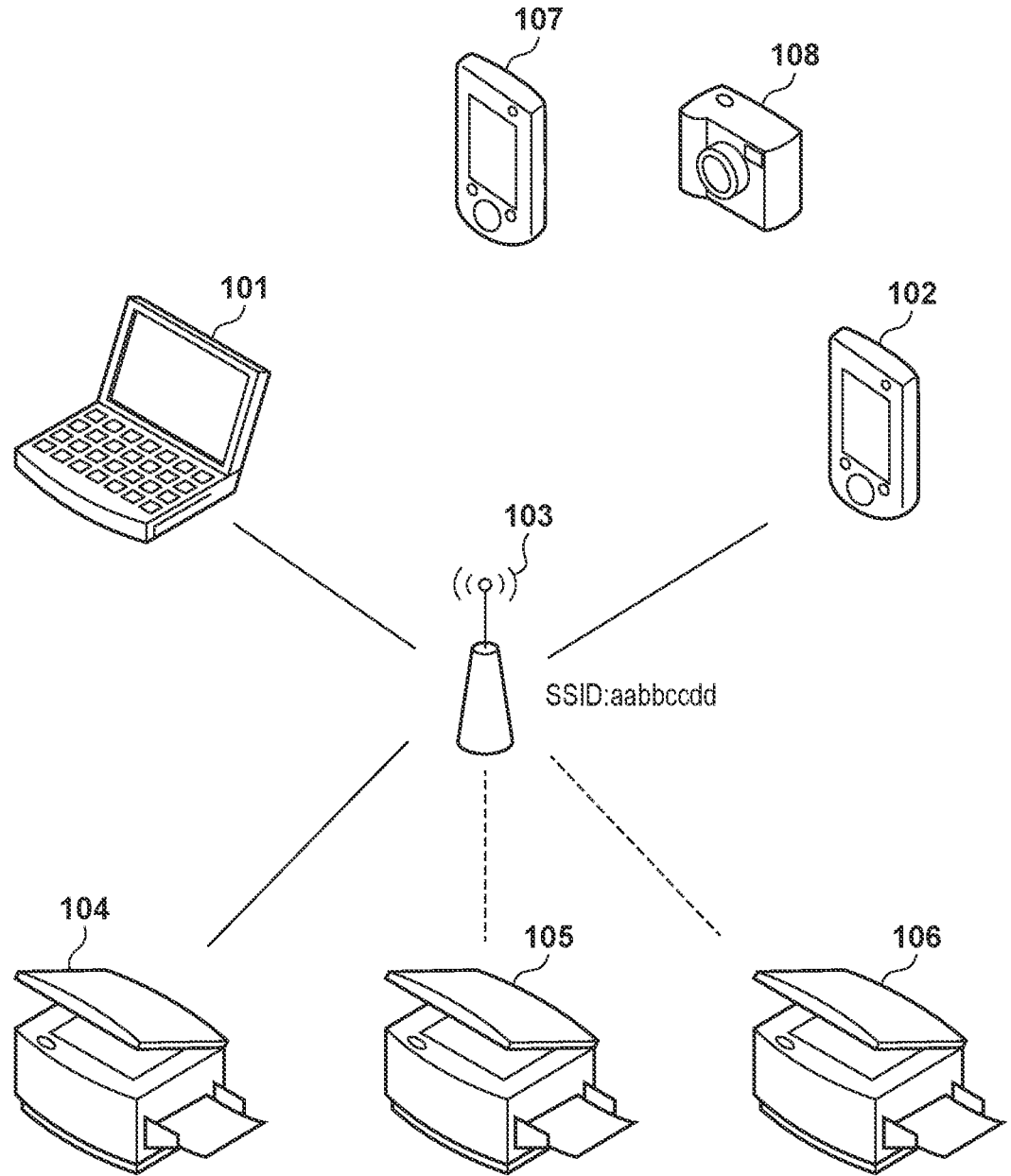
FIG. 1 is a configuration diagram of a system according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is an overall configuration diagram of a system indicating the present embodiment. In FIG. 1, there are information processing apparatuses 101, 102, 107 and 108 and printing apparatuses (communication apparatuses) 104 to 106, and the information processing apparatuses 101 and 102 are connected to a wireless LAN router (called access point or AP in the present specification) 103. The AP 103 is a communication apparatus that forms a wireless network and for example, forms a star topology wireless LAN network. A service set identifier (SSID) of the AP 103 here is "aabbccdd". The AP 103 is further connected to the printing apparatus 104. In order to indicate that the AP 103 and the printing apparatus 104 are connected, a line connecting them is shown as a solid line in FIG. 1. The printing apparatuses 105 and 106 are disconnected from the AP 103.

In FIG. 1, in order to indicate that the printing apparatuses 105 and 106 and the AP 103 are disconnected, lines connecting them are shown as a dotted line. Compared to the information processing apparatus 101, the information processing apparatus 102 is more portable. Moreover, there are the information processing apparatuses 107 and 108, which are not connected to the AP 103. A difference between the information processing apparatus 107 and the information processing apparatus 108 is that the information processing apparatus 107 is a smart phone or tablet terminal and the information processing apparatus 108 is a digital camera.

In the present embodiment, description will be given for processing in a case where at least one of the information processing apparatuses 101 and 102 connects at least one of the printing apparatuses 105 and 106 to the AP 103 by an automatic wireless LAN setup. Note that a method of the automatic wireless LAN setup here will be described by using as an example a method in which the information processing apparatus 101 or 102 and the printing apparatus 105 both connect to the AP 103. Note that in this method, the information processing apparatus 101 or 102 and the printing apparatus 105, by communicating and sharing information (such as an SSID) of the AP 103 by direct wireless communication, both connect to the AP 103.

Some information processing apparatuses set a restriction in relation to an application so as not to allow acquisition of search results of neighboring access points. In such a case, for the information processing apparatus to perform a P2P connection with a printer in a wireless setting mode, a user must operate an OS (Operating System) function of the information processing apparatus and select a printer SSID, which may cause setting to be difficult. Also, in order to allow use of the same printer via a wireless network from a plurality of information processing apparatuses, it is necessary to connect all the information processing apparatuses to a wireless network to which the information processing apparatus that performed the wireless setting of the printer is joined. In contrast to this, processing for improving convenience for when connecting a printer to the access point by the information processing apparatus that failed the automatic wireless LAN setup displaying a message prompting a user to read a barcode image such as a two-dimensional code by another information processing apparatus will be described.

Figure 2:
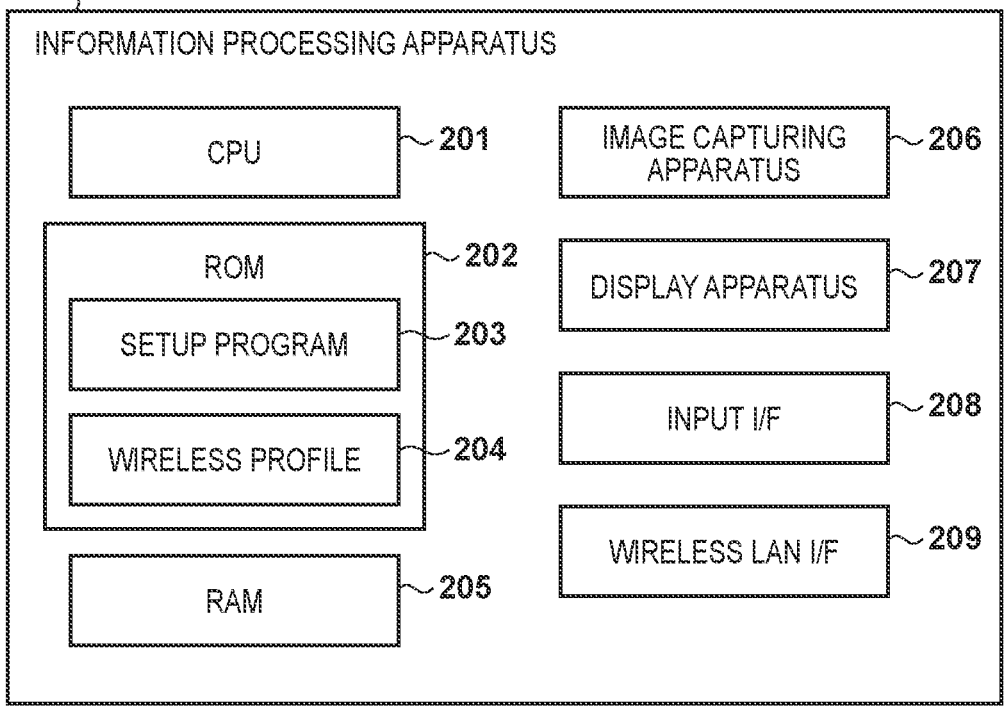
FIG. 2 is a view illustrating an example of a hardware configuration of an information processing apparatus.

FIG. 2 illustrates a hardware configuration diagram of the information processing apparatuses 101, 102, 107, and 108. The information processing apparatuses 101, 102, 107, and 108 have a CPU (Central Processing Unit) 201, a ROM (Read Only Memory) 202, and a RAM (Random Access Memory) 205. Also, the information processing apparatuses 101, 102, 107, and 108 have an image capturing apparatus 206, a display apparatus 207, an input interface (I/F) 208, and a wireless LAN I/F 209.

The CPU 201, by reading out to the RAM 205 and then executing a setup program 203 stored in the ROM 202, executes various processing that controls operations of the information processing apparatus, including wireless setting processing for instructing to a printer a wireless network setting. The ROM 202 is a storage unit that stores the program 203 corresponding to various processing including the above setup processing program, a wireless profile 204 to be described later, and the like. Also, when a wireless setting processing program (such as an application) is installed onto the information processing apparatus, unique identification information is also stored in the ROM 202. The unique identification information is uniquely decided in relation to a manufacturer or a printer model of a printer, for example.

The image capturing apparatus 206 is one or more image acquisition apparatuses, such as a camera, that is arranged in the information processing apparatus. The display apparatus 207 is an apparatus, such as a display or a projector, for notifying the user with information. The input I/F 208 is an input apparatus such as a touch panel display, a keyboard, and a toggle switch. The wireless LAN I/F 209 is a communication unit that includes a wireless transmission/reception circuit and for example, can perform wireless communication that is compliant with IEEE 802.11.

Figure 3:
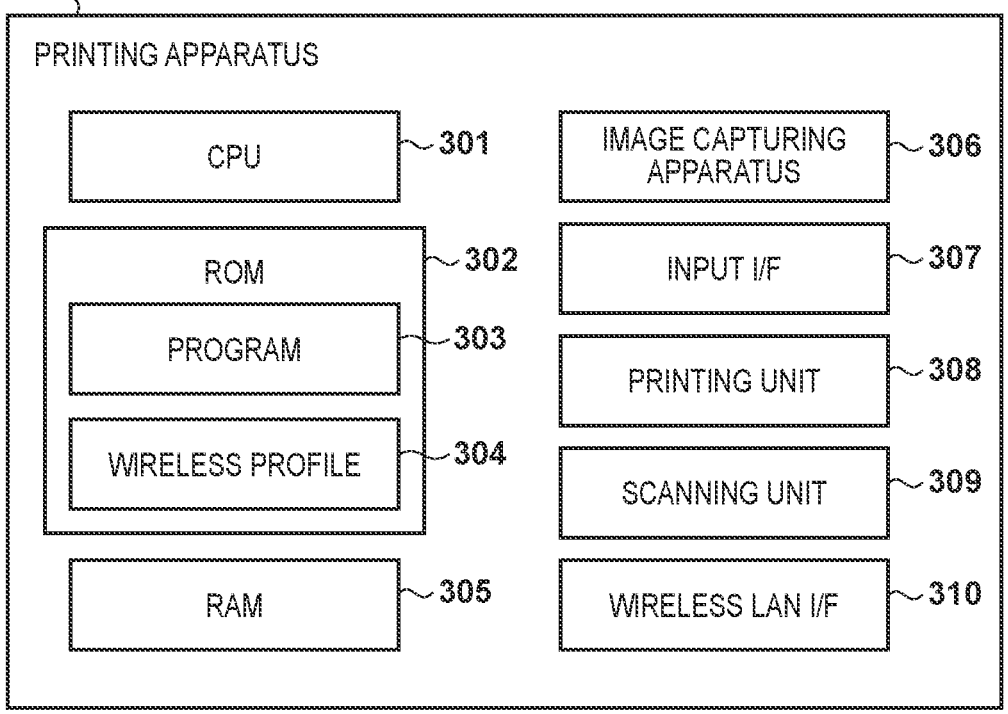
FIG. 3 is a view illustrating an example of a hardware configuration of a printing apparatus.

Note that the image capturing apparatus 206 may be omitted in the information processing apparatuses 101 and 102. Also, the wireless LAN I/F 209 may be omitted in the information processing apparatuses 107 and 108, FIG. 3 illustrates a hardware configuration diagram of the printing apparatuses 104, 105, and 106. The printing apparatuses 104, 105, and 106 have a CPU 301, a ROM 302, a RAM 305, a display apparatus 306, an input IX 307, a printing unit 308, a scanning unit 309, and a wireless LAN I/F 310.

The ROM 302 is a storage unit that stores a program 303 and a wireless profile 304. The CPU 301, by reading out to the RAM 305 from the ROM 302 and executing the program 303, executes various control by the printing apparatus.

Figure 4:
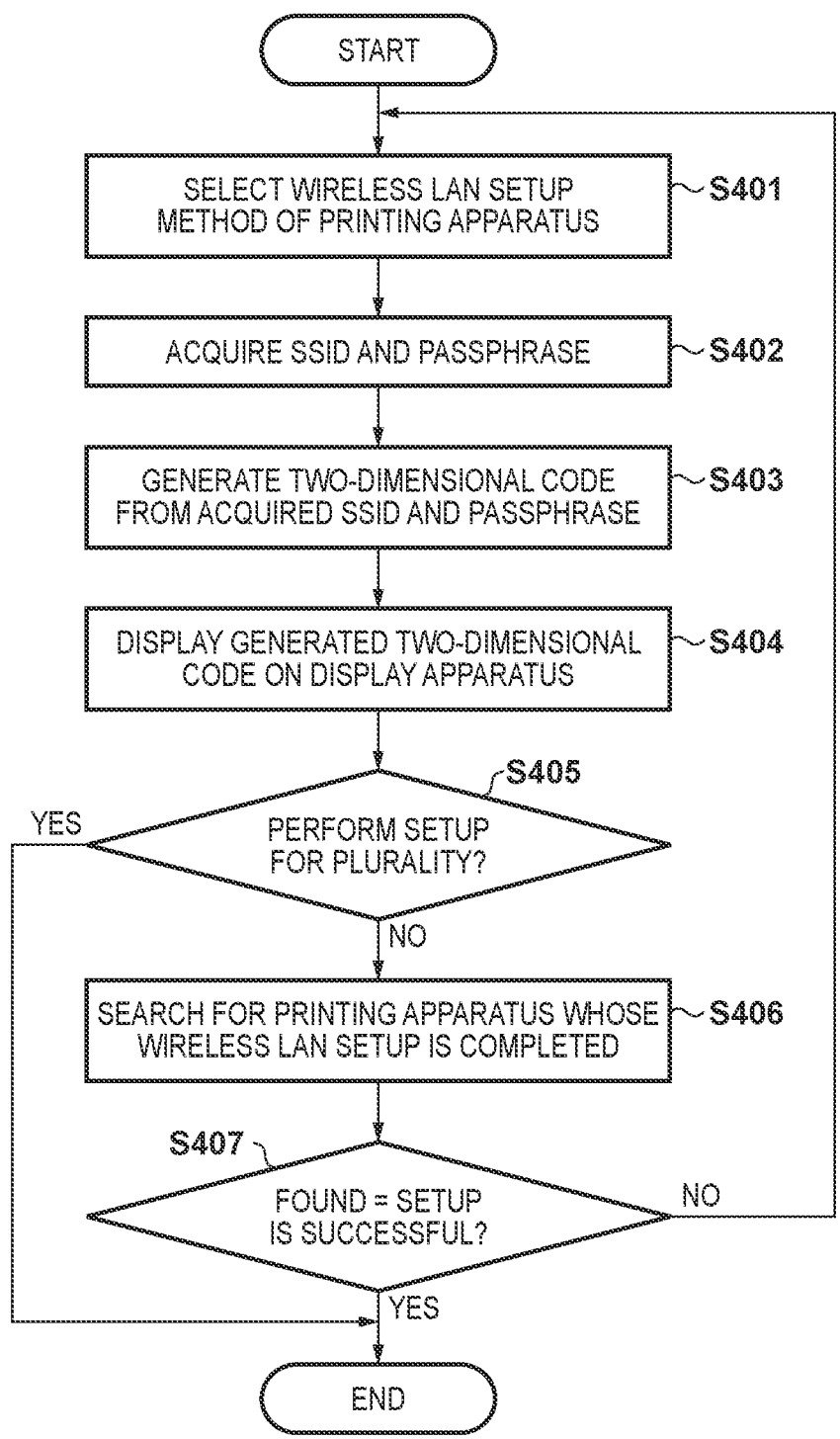
FIG. 4 is a view illustrating an example of a flowchart illustrating a flow of processing of a setup program of the information processing apparatus.

The display apparatus 306 is a display unit, such as a display or an LED for notifying the user with information. The input LT 307 is an input apparatus such as a touch panel display, a keyboard, and a toggle switch. The printing unit 308 forms an image onto a recording medium (sheet). The scanning unit 309 reads an image on a recording medium and then generates image data. Also, the scanning unit 309 can operate as a display unit of at least one of the information processing apparatuses 101, 102, 107, and 108 and as a read unit that reads a two-dimensional code recorded on a recording medium and then acquires information from the two-dimensional code, for example. The wireless LAN I/F 310 is a communication unit that includes a wireless transmission/reception circuit and for example, can perform wireless communication that is compliant with IEEE 802.11, FIG. 4 is a flowchart illustrating a flow of processing of a setup program executed by the information processing apparatus 101 or 102. The setup program 203 is stored in the ROM 202 of the information processing apparatus 101 or 102 and is loaded to the RAM 205 and then executed by the CPU 201 of the information processing apparatus 101 or 102. Also, the processing illustrated in FIG. 4 is started by the information processing apparatus 101 or 102 being instructed to execute the setup program by the user via the input I/F 208. Hereinafter, the flow of the processing of the setup program 203 is described following the flowchart in FIG. 4. Also, in the example in FIG. 4, description is given using as an example a case where the information processing apparatus 101 executes processing for connecting the printing apparatus 105 to the AP 103.

First, the information processing apparatus 101, in step S401, displays a screen 501 on the display apparatus 207 of the information processing apparatus 101 prompting to select a wireless LAN setup method. An example of a display screen is illustrated in FIG. 5. By selecting any of "SET MANUALLY", "SET BY ROUTER BUTTON (WPS)", and "TWO-DIMENSIONAL CODE" and then selecting a "NEXT" button 502 in FIG. 5, the user can select a method of executing the wireless LAN setup of the printing apparatus 105. Note that the information processing apparatus 101 may connect to a printer that is in a direct wireless connection (P2P connection) mode and then transmit information such as an SSID and a passphrase to be used for establishing a connection to the AP 103 via wireless communication, for example.

In the present embodiment, description is given assuming that a method of "TWO-DIMENSIONAL CODE" was selected by the user operation in step S401. Meanwhile, in step S401, processing, to be described later, for when the user selects a method of "SET MANUALLY" or "SET BY ROUTER BUTTON (WPS)" and then the user, after that method has failed, selects anew the method of "TWO-DIMENSIONAL CODE" may also be applied. Also, the information processing apparatus 101 may try to transmit the information to be used for establishing a connection to the AP 103 to the printing apparatus 105 by a P2P connection and in a case where the attempt has failed, may execute the processing in step S401.

When the method of "TWO-DIMENSIONAL CODE" is selected by the user operation in step S401 and then the "NEXT" button 502 is selected by the user operation using the input I/F 208 such as a mouse, the information processing apparatus 101 advances the processing to step S402. In step S402, the information processing apparatus 101 acquires from the ROM 202 the wireless profile 204, in which information for connecting to the AP 103 to which the information processing apparatus 101 is currently in a connected state is stored.

Next, the information processing apparatus 101 advances the processing to step S403 and then converts to the two-dimensional code the acquired wireless profile 204. For example, in a case where the SSID is "aabbccdd" and the passphrase is "password", a command that includes the SSID and the passphrase may be generated and then the generated command may be converted to a two-dimensional code. For example, as a command 601 for prompting the printing apparatus 105 to perform a wireless LAN setup, a two-dimensional code may be generated based on a text string, such as "DoWLANSetup; aabbccdd; password" illustrated in FIG. 6. This text string may be two-dimensionally coded by the setup program 203. Also, from a perspective of strengthening security, instead of directly two-dimensionally coding the SSID or passphrase, a method of using a technique of encryption or obfuscation to convert and then to two-dimensionally code can be considered. For example, encryption may be performed so that the command 601 in FIG. 6 can be extracted by decoding using a private key held by the setup program 203 of the information processing apparatus 101 and the program 303 of the printing apparatus 105. Also, a predetermined function, such as converting the command 601 to a binary, may be used to perform obfuscation.

Next, the information processing apparatus 101 advances the processing to step S404 and then displays on the display apparatus 207 of the information processing apparatus 101 the two-dimensional code generated in step S403 and a screen 701 that includes a message prompting the user to perform a wireless LAN setup using a more portable information processing apparatus. In a case the information processing apparatus 101 here is a highly portable device, a display screen of the display apparatus 207 can be directly read by the scanning unit 309 of the printing apparatus 105, and therefore, the processing directly advances to a flow in FIG. 9.

Figure 7:
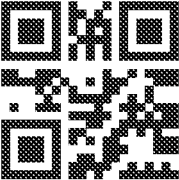
FIG. 7 is a view illustrative an example of a screen of a two-dimensional code displayed by the setup program of the information processing apparatus.

Even in a case where the portability of the information processing apparatus 101 is low and it is difficult for the scanning unit 309 of the printing apparatus 105 to directly read the display screen of the display apparatus 207, the user continues the wireless LAN setup in accordance with the message displayed on the screen 701. For example, the message may be a message such as "IN CASE IT IS DIFFICULT FOR SCANNER TO READ THIS SCREEN, BARCODE CAN BE CAPTURED BY DEVICE CAPABLE OF CAPTURING AND THEN READ" illustrated in FIG. 7. In another example, the message may be, "CAPTURE THIS BARCODE WITH SMARTPHONE AND LIKE AND THEN HAVE SCANNER OF PRINTER READ CAPTURED IMAGE".

Figure 8:
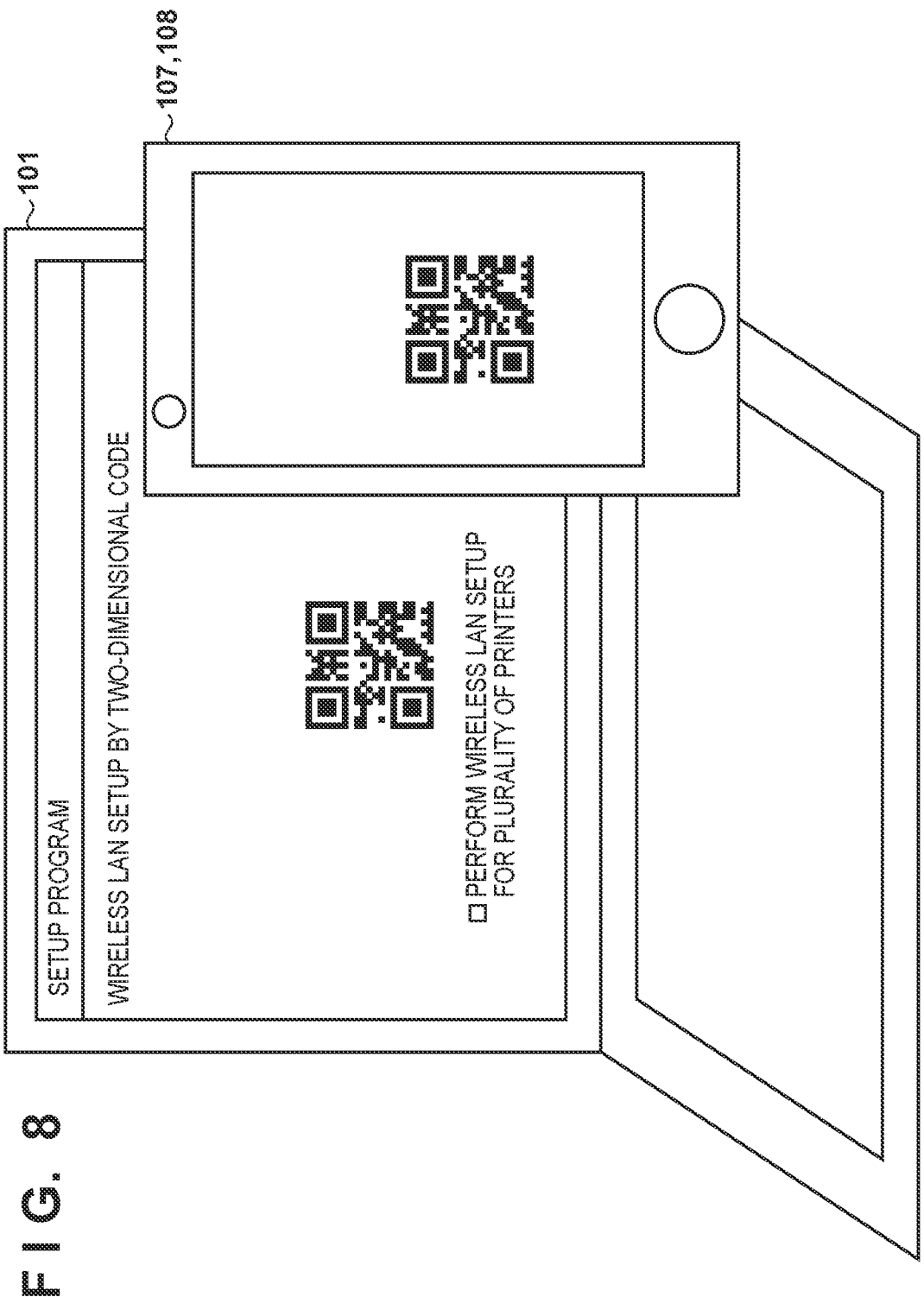
FIG. 8 is a view illustrating a situation in which the two-dimensional code displayed by the setup program of the information processing apparatus is captured by a highly portable information processing apparatus.

For example, as illustrated in FIG. 8, the user, by capturing a two-dimensional code with the information processing apparatus 107 or 108 that is more portable than the information processing apparatus 101, causes the information processing apparatus 107 or 108 to read the code. Note that reading by the information processing apparatus 107 or 108 is executed by the user operating the image capturing apparatus 206 and performing a reading instruction. By the information processing apparatus 107 or 108 reading the two-dimensional code displayed on the information processing apparatus 101, the information processing apparatus 107 or 108 can acquire the information to be used for establishing a connection to the AP 103. For example, the two-dimensional code may include information that relates to a source of a program (application) for causing the information processing apparatus 107 or 108 to execute wireless LAN setup processing. By this, the information processing apparatus 107 or 108 can use the information that relates to the source, download an application for executing the above-described automatic wireless LAN setup, and then install the program. Accordingly, the user, by an image capturing operation for connecting the printing apparatus 105 to the AP 103, can install onto the information processing apparatus 107 or 108 the program. Thus, even without separately performing an operation for the installation, it is possible to install the program onto the information processing apparatus 107 or 108.

Also, a configuration may be taken so that the information processing apparatus 107, by using an application for the present embodiment, captures the above two-dimensional code. Also, an operation may be taken so that the information processing apparatus 107 is also connected to the AP 103 by the information of the AP 103 that is included in the two-dimensional code. In such a case, the application of the information processing apparatus 107, by designating in relation to the OS of the information processing apparatus 107 the SSID and the password of the AP 103 acquired from the two-dimensional code, connects the information processing apparatus 107 to the AP 103, for example. Then, by an operation to be described later, using the captured image of the two-dimensional code, the printing apparatus 105 can be connected to the AP 103.

Moreover, the application of the information processing apparatus 107, when the two-dimensional code is captured, may display a screen for querying the user whether or not to install onto the information processing apparatus 107 a program for an automatic wireless LAN setup and whether or not to connect the information processing apparatus 107 to the AP 103. Then, in accordance with a user instruction that is related to the screen, program installation or connection to the AP 103 is performed.

Next, a method of connecting the printing apparatus 105 to the AP 103 using the captured image of the two-dimensional code will be described. Because the information processing apparatus 107 or 108 is more portable than the information processing apparatus 101, the two-dimensional code that is displayed on the display apparatus 207 of the information processing apparatus 107 or 108 can be directly read by the scanning unit 309 of the printing apparatus 105. Accordingly, the user moves the information processing apparatus 107 or 108 close to the printing apparatus 105 and advances to a flow to be described later in FIG. 9.

Based on a display of the two-dimensional code in step S404, the user can perform a wireless LAN setup of one or more printing apparatuses. For example, the user, by selecting a "NEXT" button 702 that is displayed on the display apparatus 207 of the information processing apparatus 101, performs the wireless LAN setup of a plurality of printing apparatuses.

When the "NEXT" button 702 is selected, the information processing apparatus 101, in step S405, determines whether a setup of a plurality of printers in addition to a specified printer (e.g., the printing apparatus 105) was designated by the user. Specifically, it is determined whether or not ON was selected as the setting of "PERFORM WIRELESS LAN SETUP FOR PLURALITY OF PRINTERS" by the user in the screen 701. In a case where "PERFORM WIRELESS LAN SETUP FOR PLURALITY OF PRINTERS" was selected, the information processing apparatus 101 omits processing to be described later in step S406 for searching for the printing apparatus 105 whose wireless LAN setup is completed, and then ends the program.

Meanwhile, in a case where OFF was selected as the setting of "PERFORM WIRELESS LAN SETUP FOR PLURALITY OF PRINTERS" by the user, the setup program 203 advances the processing to step S406. Next, the information processing apparatus 101, in step S406, assuming that the wireless LAN setup was performed for only one printer, performs a search for the printing apparatus 105 whose wireless LAN setup is completed. Specifically, before the processing illustrated in FIG. 4 is started, a printer model to be set up is specified. For example, model information may be set in advance in a program that executes the processing illustrated in FIG. 4, or the user may designate a model when the processing illustrated in FIG. 4 is executed. Then, in step S406, a printer of the model information is searched for within the same network as the information processing apparatus 101. Also, in a case where a plurality of printers of the same model is found, a list of the plurality of printers is displayed, and the user selects a desired printer to be set up. Next, the information processing apparatus 101 advances the processing to step S407, and in a case where the search for the printing apparatus 105 whose wireless LAN setup is completed is successful, ends the program. In a case where the search fails, the information processing apparatus 101 returns the processing to step S401, in other words, to the start of the setup program 203, and re-starts the setup processing anew. For example, in a case where at least one printer of a specific model is found, it is assumed that the search for the printing apparatus 105 whose wireless LAN setup is completed is successful.

Note that even in a case where ON was selected as a setting of "PERFORM WIRELESS LAN SETUP FOR PLURALITY OF PRINTERS", a specific model may be searched for, and the user may select the desired printer.

Figure 9:
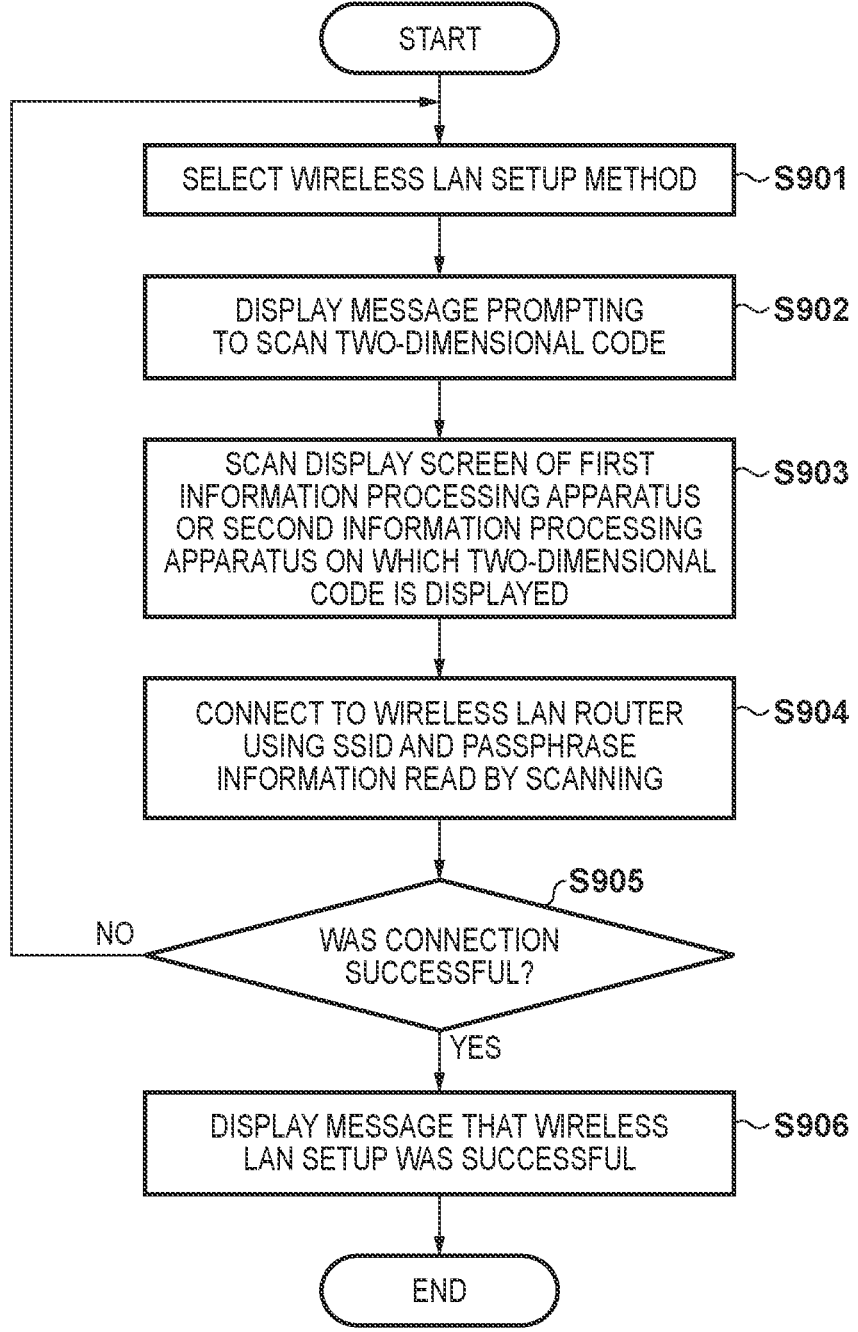
FIG. 9 is a view illustrating an example of a flowchart illustrating a flow of processing of the wireless LAN setup of the printing apparatus.
Figure 10:
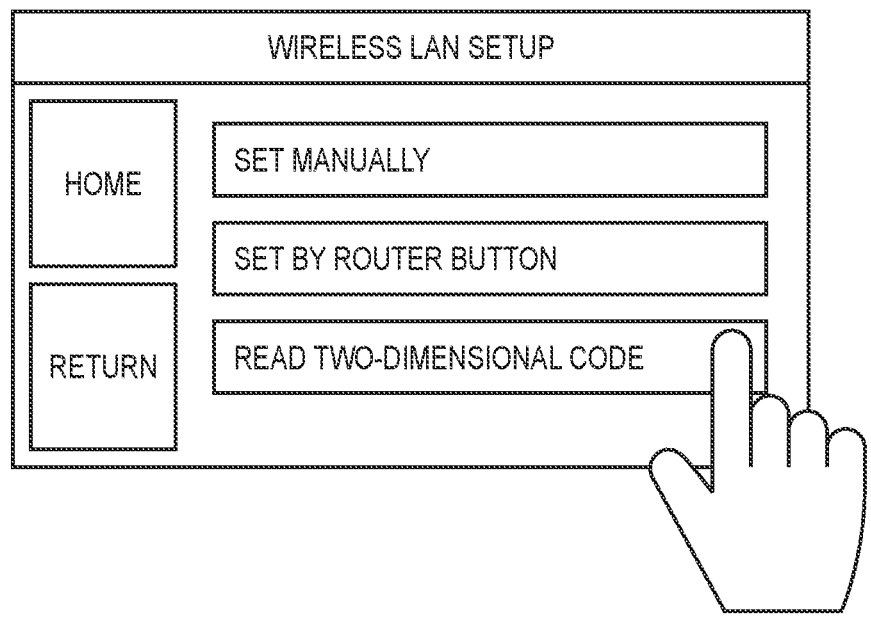
FIG. 10 is a view illustrating an example of a screen for selecting the wireless LAN setup method displayed on the display apparatus of the printing apparatus.

FIG. 9 is a flowchart illustrating the flow of processing of the wireless LAN setup executed by the printing apparatus 105 or 106. In the present embodiment, description is given using as an example a case where the printing apparatus 105 executes the processing in FIG. 9. First, in step S901, the printing apparatus 105 accepts from the user a selection of a method of the wireless LAN setup. The selection is performed by the user using the display apparatus 306 and the input OF 307 of the printing apparatus 105. FIG. 10 is an example of a representation of a state in which the user performs the selection. In this example, the display apparatus 306, which is a liquid crystal panel, and the input I/F 307, which is a touch panel, are provided on the printing apparatus 105. For the display apparatus 306, there are those with only LED lamps instead of a screen or a combination thereof, and for the input IN 307, there are those with only buttons or combination of buttons and a screen. FIG. 10 illustrates a situation in which the user selects "READ TWO-DIMENSIONAL CODE" as the wireless LAN setup method of the printing apparatus 105.

Figure 11:
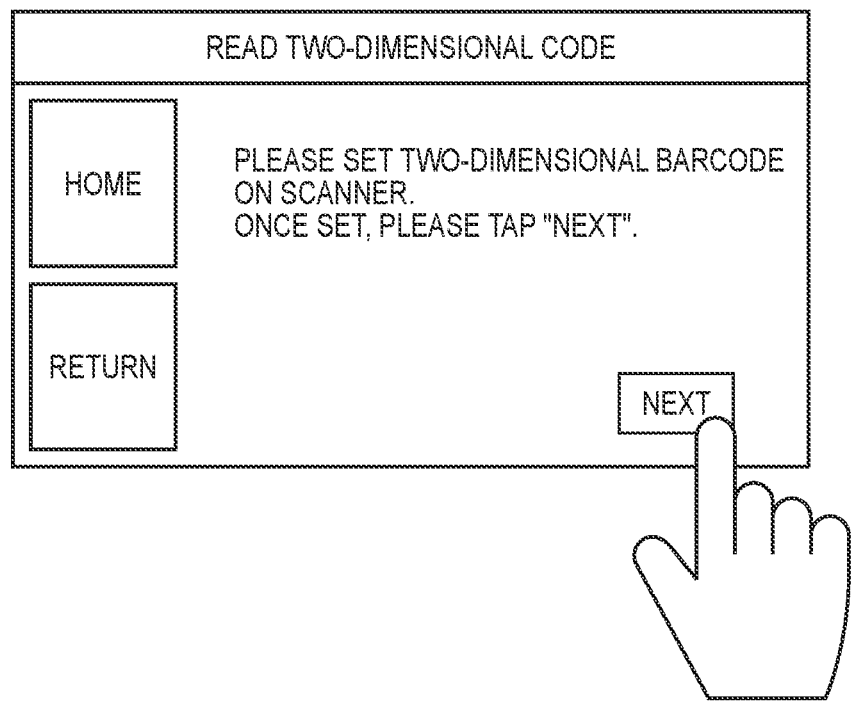
FIG. 11 is a view illustrating an example of a screen for prompting reading of the two-dimensional code displayed by the display apparatus of the printing apparatus.
Figure 12:
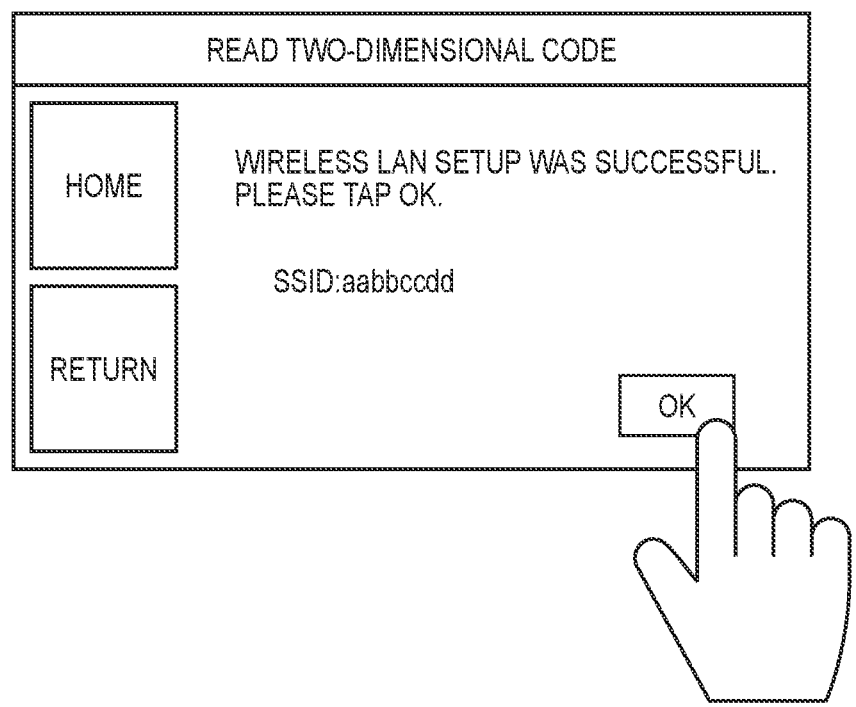
FIG. 12 is a view illustrating an example of a screen for notifying that the wireless LAN setup was successful displayed by the display apparatus of the printing apparatus.

In step S901, when the printing apparatus 105 accepts the selection of the wireless LAN setup method, the printing apparatus 105 advances the processing to step S902. In step S902, the printing apparatus 105 displays a message prompting the user to scan the two-dimensional code. FIG. 11 is a message prompting to read the two-dimensional code displayed by the display apparatus 306 of the printing apparatus 105. In step S902, the printing apparatus 105 waits for the two-dimensional code to be set on the scanning unit 309. For example, the user sets the two-dimensional code displayed on the display apparatus 207 of the information processing apparatus 101 in step S404 in FIG. 4, or captures the two-dimensional code with the highly portable information processing apparatus 107 or 108 and then sets the two-dimensional code displayed on the display apparatus 207. When the user, after setting, selects "NEXT" on a screen in FIG. 11, reading is started. Next, the printing apparatus 105 advances the processing to step S903, and then reads the two-dimensional code displayed on the display apparatus 207 of the information processing apparatus 101, 107, or 108. Next, the printing apparatus 105 advances the processing to step S904 and acquires from the captured data of the read two-dimensional code the command 601 to be used in the wireless LAN setup. When acquiring, the printing apparatus 105 may perform encryption and obfuscation decoding described in step S403 of the flow in FIG. 4. The printing apparatus 105 that acquired the command 601 to be used in the wireless LAN setup uses the command 601 and tries to connect to the AP 103. Next, the printing apparatus 105 advances the processing to step S905 and in a case where connection to the AP 103 fails (No in step S905), returns the processing to step S901 and then repeats the wireless LAN setup processing again. In a case where the connection to the AP 103 is successful (Yes in step S905), the processing is advanced to step S906. Next, in step S906, the printing apparatus 105 displays on the display apparatus 306 that the wireless LAN setup was successful. FIG. 12 is a message that wireless LAN setup succeeded displayed by the display apparatus 306 of the printing apparatus 105. Here, when the user selects "OK" on the input IX 307, the wireless LAN setup processing of the printing apparatus 105 is completed.

Here, by executing the flow illustrated in FIG. 9 similarly to the print apparatus 106, connection processing to the same AP 103 can be performed for two printers. Of course, it is also possible to perform the wireless LAN setup processing in relation to three or more printing apparatuses.

Other Embodiments

In the first embodiment, the information processing apparatus 107 or 108 that read the two-dimensional code of the information processing apparatus 101 caused the printing apparatus 105 to execute the wireless LAN setup processing by displaying the two-dimensional code. For example, the information processing apparatus 107 or 108 may perform a P2P connection to the printing apparatus 105 and transmit information to be used for establishing a connection to the AP 103 via wireless communication. In such a case, the two-dimensional code of the information processing apparatus 101 may be generated based on the information to be used for establishing a connection to the AP 103 as well as information to be used for establishing a connection with the printing apparatus 105. Also, in such a case, the printing apparatus 105, in a case where the two-dimensional code could not be read within a predetermined time in step S902, may await the P2P connection. Alternatively, the printing apparatus 105, in a case where execution of the wireless LAN setup processing by the two-dimensional code was instructed in step S901, may await the P2P connection. Also, in such a case, a message prompting a user to move the information processing apparatus 107 or 108 to a distance so as to be able to communicate with the printing apparatus 105, such as "PLEASE COME CLOSE TO WITHIN 10 m OF THE PRINTER", may be displayed on the screen 701 illustrated in FIG. 7. Alternatively, a message such as "PLEASE HOLD THE SMART PHONE THAT READ TWO-DIMENSIONAL CODE UP TO THE NFC COMMUNICATION UNIT OF THE PRINTER" may be displayed on the screen 701 illustrated in FIG. 7. Also, an image illustrating the NFC communication unit of the printer may be displayed on the screen 701, for example. By this, the user, simply by moving close to the printer or holding the smart phone that read the two-dimensional code up to the printer, can easily execute the wireless LAN setup processing to connect to the AP 103 the printing apparatus 105.

In the first embodiment, the information processing apparatus 107 or 108 was described to read the two-dimensional code displayed on the information processing apparatus 101 and to acquire information to be used for establishing a connection to the AP 103. For example, the information processing apparatus 107 or 108, by a camera application, may capture the two-dimensional code displayed on the information processing apparatus 101 and display on the display unit the captured data to be held up to the read unit of the printing apparatus 105. By this, even in a case where the information to be used for establishing a connection to the AP 103 is encrypted or is obfuscated, the information processing apparatus 107 or 108 can cause the printing apparatus 105 to execute the wireless LAN setup processing without decoding encryption or obfuscation.

Note that various codes such as a barcode may be used instead of the above-described two-dimensional code.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-064200, filed on Mar. 31, 2020, which is hereby incorporated by reference herein in its entirety,

What is claimed is:

1. A control method executed by a first information processing apparatus, the method comprising:
    transmitting information to be used for establishing a connection with an access point to a communication apparatus which is different from both of the first information processing apparatus and the access point by communicating with the first information processing apparatus and the communication apparatus; and
    displaying on a display unit, in a case where the transmission of the information to be used for establishing the connection with the access point fails, a screen including a code image and a message prompting a user to capture the code image by a second information processing apparatus, which is different from any of the first information processing apparatus, the communication apparatus, and the access point,
    wherein, based on the code image being captured by the second information processing apparatus, at least one of information to be used for establishing a connection with the access point and information for installing, on the second information processing apparatus, an application program for transmitting, from the second information processing apparatus to the communication apparatus, the information to be used for establishing a connection with the access point is obtained by the second information processing apparatus.

2. The control method according to claim 1, wherein in a case where the transmission of the information is successful, the screen is not displayed.

3. The control method according to claim 1, wherein the information to be used for establishing a connection to the access point includes a service set identifier (SSID) and a passphrase of the access point.

4. The control method according to claim 1, wherein the displaying is performed based on the information which has been encrypted or obfuscated.

5. The control method according to claim 1, wherein the second information processing apparatus is any of a smart phone, a tablet terminal, and a digital camera.

6. The control method according to claim 1, wherein a message prompting a user to hold a read unit the second information processing apparatus that captured the code image up to the communication apparatus is displayed.

7. The control method according to claim 1, wherein the code image to be displayed is an image generated based on the information and information that relates to a source of an application to be executed by the second information processing apparatus.

8. The control method according to claim 1, wherein the code image to be displayed is an image generated based on the information to be used for establishing a connection to the access point and information that relates to a model of the communication apparatus.

9. The control method according to claim 8, wherein a message prompting a user to move the second information processing apparatus to a distance at which communication with the communication apparatus is possible is displayed on the display unit.

10. The control method according to claim 1, wherein in a case where the code image is captured by the second information processing apparatus, both of information to be used for establishing a connection with the access point and information for installing, on the second information processing apparatus, an application program for transmitting, from the second information processing apparatus to the communication apparatus, the information to be used for establishing a connection with the access point is obtained by the second information processing apparatus.

11. The control method according to claim 1, wherein the information to be used for establishing a connection with the access point is transmitted to the communication apparatus via a P2P connection between the first information processing apparatus and the communication apparatus.

12. The control method according to claim 1, wherein the information to be used for establishing a connection with the access point is transmitted to the communication apparatus via Wi-Fi Protected Setup (WPS).

13. The control method according to claim 1, wherein the code image is a two-dimensional code.

14. The control method according to claim 1, wherein the communication apparatus is a printing apparatus.

15. A non-transitory computer-readable storage medium operable to store a program that is executed by a first information processing apparatus, the program causing a computer to execute a control method, the method comprising:

transmitting information to be used for establishing a connection with an access point to a communication apparatus which is different from both of the first information processing apparatus and the access point by communicating with the first information processing apparatus and the communication apparatus; and displaying on a display unit, in a case where the transmission of the information to be used for establishing the connection with the access point fails, a screen including a code image and a message prompting a user to capture the code image by a second information processing apparatus, which is different from any of the first information processing apparatus, the communication apparatus, and the access point, wherein, based on the code image being captured by the second information processing apparatus, at least one of information to be used for establishing a connection with the access point and information for installing, on the second information processing apparatus, an application program for transmitting, from the second information processing apparatus to the communication apparatus, the information to be used for establishing a connection with the access point is obtained by the second information processing apparatus.

16. An information processing apparatus comprising:

one or more processors; and one or more memories storing instructions that, when executed by the one or more processors, cause the information processing apparatus to:

transmit information to be used for establishing a connection with an access point to a communication apparatus which is different from both of the first information processing apparatus and the access point by communicating with the first information processing apparatus and the second communication apparatus; and display on a display unit, in a case where the transmission of the information to be used for establishing the connection with the access point fails, a screen including a code image and a message prompting a user to capture the code image by another information processing apparatus, which is different from any of the first information processing apparatus, the communication apparatus, and the access point, wherein, based on the code image being captured by the another information processing apparatus, at least one of information to be used for establishing a connection with the access point and information for installing, on the another information processing apparatus, an application program for transmitting, from the another information processing apparatus to the communication apparatus, the information to be used for establishing a connection with the access point is obtained by the another information processing apparatus.

* * * * *